United States Patent [19]

Madonia et al.

[11] 4,411,938

[45] Oct. 25, 1983

[54] MULTI-GROOVE TRIM

[76] Inventors: Ciro Madonia, 1390 Beaufort Dr., Burlington, Ontario; Christopher Hatzikelis, R.R. #1,, Palgrave, Ontario; Cesare C. Cosentino, 45 Grandview Ave., Thornhill, Ontario, all of Canada

[21] Appl. No.: 319,140

[22] Filed: Nov. 9, 1981

Related U.S. Application Data

[63] Continuation of Ser. No. 149,468, May 13, 1980, abandoned.

[51] Int. Cl.³ .................... B32B 27/06; B32B 3/30
[52] U.S. Cl. ..................... 428/31; 428/167; 428/172; 428/195; 428/343
[58] Field of Search ............ 428/31, 167, 161, 172, 428/195, 343

[56] References Cited

U.S. PATENT DOCUMENTS

| | | | |
|---|---|---|---|
| 3,606,431 | 9/1971 | Kunevicius | 428/31 |
| 4,010,297 | 3/1977 | Wenrick | 428/31 |
| 4,066,285 | 1/1978 | Hall et al. | 428/31 |

Primary Examiner—Paul J. Thibodeau

[57] ABSTRACT

A decorative and protective flexible low profile trim has a plurality of raised ribs extending lengthwise therealong, having a plurality of relatively shallowly depressed valley portions defined thereby, and includes the provision of substantially planar decorative color stripes located in the valley portions, the raised rib portions adjacent thereto providing protective abutments on at least one flank of each adjoining colored stripe.

1 Claim, 2 Drawing Figures

MULTI-GROOVE TRIM

BACKGROUND OF THE INVENTION

This is a continuation of application Ser. No. 149,468, filed May 13, 1980, now abandoned.

This invention is directed to decorative trim and in particular to elongated extruded body molding.

The provision of extruded polyvinyl chloride body moldings and other forms of adherent protective moldings for use with motor vehicles is well known.

In order to enhance the attractiveness of such moldings it is often the practice to provide colouration to such moldings, either on the full surface thereof, or in the form of one or more stripes extending along the molding.

It has been found that such stripes and other finished particularly those of a bright metal finish, are subject to appearance degradation due to impact thereagainst producing local deformation, scratching and the like. Also, such surface impacts cause damage to protective finishes with which such bright finishes are coated, thereby permitting the onset of oxidation, with consequent deterioration in appearance.

SUMMARY OF THE INVENTION

In accordance with the present invention there is provided a decorative and protective low profile flexible trim molding for adherant conforming attachment to a surface having at least one shallow recessed valley portion on the surface thereof, extending longitudinally of the strip, with a substantially planar decorative stripe located therein and substantially protected against impact damage by adjacent equally raised shoulder portions of the unitary strip molding.

A particular embodiment is provided having a plurality of recessed valley portions extending in substantially mutually parallel relation along the length of the molding, having raised portions extending as substantially equally raised ribs in protective relation along the molding.

The subject molding may be readily fabricated by extrusion of a polyvinylchloride or the like unitary plastic base having a predetermined number of shallow valley recesses wherein coloured or metallized substantially planar laminates are inserted, and protective overcoatings well known in the art, applied thereover.

Additional finishes, such as transverse lining of the top crests of the ribs may also be applied during manufacture.

One or more contact adhesive adherent strips are applied to the reverse face of the moldings to provide adhesion thereof to the surface to be protected, such as the door of a car.

BRIEF DESCRIPTION OF THE DRAWINGS

An embodiment of the invention is described, reference being made to the accompanying drawings, wherein.

DETAILED DESCRIPTION OF PREFERRED EMBODIMENTS OF THE INVENTION

Figure 1:
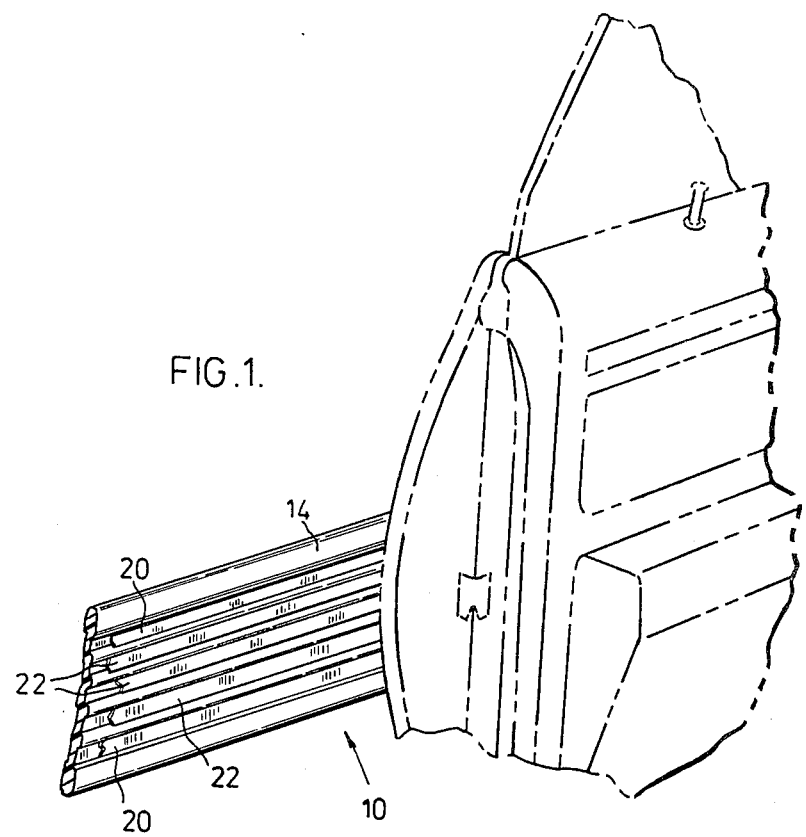
FIG. 1 is a plan view of a decorative trim in accordance with the present invention.
Figure 2:
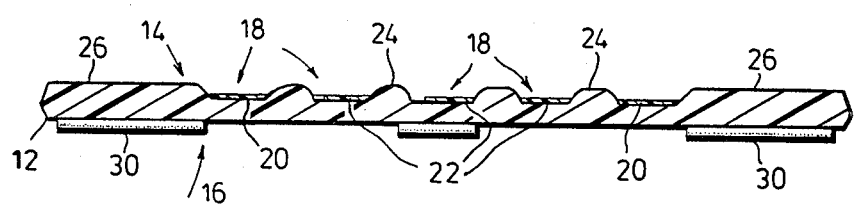
FIG. 2 is an end section of the trim of FIG. 1.

Referring to the drawings, the illustrated arrangement 10 comprises a unitary low profile extruded protective trim section 12 of generally rectangular shape having an outer face 14 and a reverse surface 16.

The outer or decorative surface 14 has a plurality of shallow recessed valley portions 18 wherein are adhered, by well known process such as contact adhesive, substantially planar decorative stripes 20,22 being cross hatched for purposes of indicating a decorative finish. A plurality of substantially equally raised shoulder portions 24 and raised edge portions 26 serve to protect the valley portions 18 against penetration of door edges and the like which in a normal installation would impact transversely to the length of the molding, as illustrated in phantom.

The reverse surface 16 is provided with three strips of contact adhesive 30, including two outside strips and a central strip, for attaching the molding to a surface to be protected.

What I claim by Letter Patent is:

1. A decorative and protective plastic trim, comprising an extruded plastic base of generally rectangular section with a pair of opposed major faces bounded by a pair of minor sides to provide a slim, low profile base section; one said major face having a plurality of spaced apart contact adhesive strips in adherent relation therewith, for attaching the plastic section to the side of a vehicle; the other said major face having a plurality of valley recesses extending along the base, a plurality of shoulder portions and raised edge portions extending in protective relation and serving to define said recesses and metallized laminate decorative strips extending in adherent relation along at least some said recesses having protective overcoatings thereover.

* * * * *